United States Patent [19]

Lockwood, Jr.

[11] Patent Number: 4,708,159

[45] Date of Patent: Nov. 24, 1987

[54] PULSE COMBUSTION ENERGY SYSTEM

[75] Inventor: Hanford N. Lockwood, Jr., San Mateo, Calif.

[73] Assignee: NEA Technologies, Inc., San Francisco, Calif.

[21] Appl. No.: 852,854

[22] Filed: Apr. 16, 1986

[51] Int. Cl.[4] .............................................. F16K 49/00

[52] U.S. Cl. ................................ 137/340; 137/624.14; 251/129.11; 60/39.77; 60/39.78; 431/1; 431/18

[58] Field of Search ................. 60/39.76, 39.77, 39.78; 137/624.13, 624.14, 624.11, 340, 625.31; 431/1, 18, 19; 251/129.11

[56] References Cited

U.S. PATENT DOCUMENTS

| | | | |
|---|---|---|---|
| 2,374,569 | 4/1945 | Tramontini | 431/18 |
| 2,907,382 | 10/1959 | McIlvaine | 431/1 |
| 2,923,124 | 2/1960 | Mendez | 60/39.78 |
| 3,006,144 | 10/1961 | Arnett et al. | 137/624.13 |
| 3,409,382 | 11/1968 | Voorheis | 431/18 |
| 3,462,955 | 8/1969 | Lockwood et al. | 60/249 |
| 3,650,295 | 3/1972 | Smith | 137/614.17 |
| 4,080,149 | 3/1978 | Wolfe | 431/1 |
| 4,392,509 | 7/1983 | Siddall | 137/340 |

FOREIGN PATENT DOCUMENTS

| | | | |
|---|---|---|---|
| 1109622 | 6/1961 | Fed. Rep. of Germany | 431/1 |
| 1110800 | 7/1961 | Fed. Rep. of Germany | 431/1 |
| 238677 | 11/1985 | Japan . | |

OTHER PUBLICATIONS

"A Review of Pulse-Combustor Technology", Abbott A. Putman, Pulse Combustion Technology for Heating Applications, Argonne National Laboratory, 11/79.

*Primary Examiner*—A. Michael Chambers
*Attorney, Agent, or Firm*—Townsend and Townsend

[57] ABSTRACT

A pulse combustion energy system including a pulse combustor coupled to a processing tube for flowing material to be processed therethrough, the processing tube being coupled to a pair of cyclone collectors for receiving the material flowing therefrom. An optional recycling section is coupled to the cyclone collectors for flowing vapor from the cyclone collectors back to the upstream end of the processing tube. The pulse combustor includes a rotary valve, a combustion chamber, an inner tail pipe and an outer tail pipe. The combustion chamber and inner tail pipe are conical and tubular sections mounted in longitudinal compression, and the compressive forces are transmitted externally across the junction of the combustion chamber and tail pipe by a strongback assembly. The rotary valve includes first, second, and third closely adjacent cylinders defining an interior air chamber. The cylinders have radially oriented, substantially aligned apertures which define an air intake. Air passing from the air chamber into the combustion chamber passes through an annular passage which impedes air flow from the combustion chamber toward the air chamber to a greater extent than air flow from the air chamber to the combustion chamber. Control systems regulate the product feed rate, the system firing rate, the system flow rate, and the operating frequency of the pulse combustor.

28 Claims, 9 Drawing Figures

PULSE COMBUSTION ENERGY SYSTEM

BACKGROUND OF THE INVENTION

This invention relates to drying equipment and processes, and more particularly, to a novel drying apparatus and process in which the material to be dried is atomized and dried by the pulsating flow of a stream of hot gases.

The general process known as combustion drying has been in use for many years. The process has been widely used to remove moisture to obtain or recover a solid material which has been in suspension or solution in a fluid. Typically, the fluid is atomized and the resultant spray is subjected to a flow of hot gases from a combustion process such as that available from an air heater or a pulse combustor to evaporate the moisture from the spray. The solid particles are then carried from the drying chamber by the flow of the drying gas and are removed from the gas by means such as a cyclone separator.

There are two types of pulse combustors. The first is the valved type pulse combustor of which the V-1 "Buzz Bomb" engine is the best known example. The second is the air valved pulse combustor which uses the pulse energy to pump its combustion air. The best known example of this type is the air valve engine developed by Mr. Raymond Lockwood and disclosed in many of his patents such as U.S. Pat. No. 3,462,955.

An air valved pulse combustor consists of a combustion chamber where the fuel is introduced, a combustion chamber inlet which is a short tube, and a combustion chamber tail pipe which is longer than the combustion chamber inlet. Fuel is pressure atomized in the combustion chamber, and when the proper explosive mixture is reached, a spark plug ignites it for initial starting. The fuel and air explode and burning gas expands out both the inlet tube and the outlet tube. The energy released in the explosion provides thrust or power when the two shock waves exit from the combustion chamber. One shock wave will exit from the short inlet tube of the chamber before the second shock wave can exit from the tail pipe.

The momentum of the combustion products causes a partial vacuum to develop in the combustion chamber, causing a reverse flow in both the inlet and tail pipe. This reverse flow brings a new air charge into the combustion chamber where the air mixes with a new fuel charge and with the hot gas which reversed its flow in the tail pipe. The momentum of the reverse flow causes a slight compression to develop in the combustion chamber and a very vigorous mixing of the fuel, air, and hot combustion products results. Spontaneous ignition of the mixture takes place and the process repeats itself about 100 times per second.

Most pulse combustion systems today use the air valve engine because it is simple to make and has no mechanical moving parts. However, the air valve system uses a substantial percentage of the energy from the combustion process to pump the combustion air required for the succeeding fuel detonations. Even though this system can be made into an efficient thrust producing engine through the addition of thrust augmenters, the energy consumed in pumping the combustion air detracts from the total energy available for the process and reduces the overall system efficiency.

The valved type pulse combustor uses the same combustion principle except that it has a mechanical (reed, flapper, or primitive rotary type) valve on the combustion chamber inlet side which prevents any back flow of combustion products out of the inlet tube. The valve is closed during the final phase of fuel/air mixing and during the explosion, so all of the combustion products exit through the tail pipe, preceded by the shock wave. However, these valved type systems have experienced limited valve life in the hot environment of the engine inlet since the valve must open and close with each combustion cycle, which can be over 100 times per second.

A further problem with engine life which affects both types of pulse combustors is caused by the corrosive effects of the hot combustion gases. Parts of the system which experience the hottest temperatures deteriorate quickly, necessitating frequent expensive repair and replacement of those parts. Attempts to fabricate such parts from corrosion resistant material, such as high quality stainless steel or inconel, have been unsuccessful because the parts have failed due to mechanical and thermal stresses in the system. Attempts to fabricate such parts from ceramics have failed because of the prohibitive costs associated with existing technology. A major reason for the prohibitive costs of ceramic construction is that the components must be cast as thick walled sections which must then be machined to form flanges, apertures, etc. This process wastes expensive ceramic material and requires extensive labor and the use of sophisticated tooling and cutting techniques.

The effectiveness of a pulse combustion energy system depends a great deal on its operating charcteristics. For example, the operating frequency affects the rate of flow through the system (and hence drying time) of material to be dried, and the amplitude, or pressure, of the sonic shock wave must be appropriate for given material since too much pressure overdries or destroys the material while too little pressure provides inadequate drying.

Present systems operate only at the natural frequency of the pulse combustor which is set by the length of the exhaust tubes. Accordingly, the operating frequency, and hence drying rate, cannot be altered without the substantial expenditures resulting from system reconstruction. This often results in systems which will only achieve their maximum efficiency when used to dry a specific type of material. Furthermore, since the natural frequency of the pulse combustor also depends on the speed of sound, variations in temperature in the combustor will change the natural frequency. As the natural frequency deviates from the frequency of optimal performance of the pulse combustor, the amplitude of the pressure wave diminishes, increasing the drying time of some products above acceptable levels. The result is lack of uniformity and effectiveness in drying.

Another disadvantage of present systems resides in the inability to meet OSHA standards. External noise has been a major reason for industry to discount pulse combustion as a viable alternative energy source since ambient noise can exceed 120 dB.

Finally, a risk of explosion is often present because of overheating during operation, excessive fuel buildup during start-up, or combustion of the dried product when there is excessive oxygen in the drying gas stream.

SUMMARY OF THE INVENTION

The present invention is a pulse combustion energy system which, as one of its functions, recovers a solid material which has been in suspension or solution in a fluid. In one embodiment of the present invention, a pulse combustor is coupled to a processing tube which in turn is coupled to a pair of cyclone collectors. Material to be processed is flowed into an upstream end of the processing tube and the resulting processed material is removed from the combustion stream by the cyclone collectors.

The downstream end of the processing tube is constricted so that the sonic pulses emitted from the pulse combustor are partially reflected back, establishing in part a pattern of standing waves which improve processing efficiency. The processing tube also includes a wave tuner (for manually adjusting the amplitude of the sonic pulses) and a series of baffles for suppressing sound. A decoupler disposed at the upstream end of the processing tube allows the natural frequency of the combustor to be varied without the need for expensive system reconfiguration.

The pulse combustion energy system can be provided with a recycling section which recycles the vapor entering the cyclone collectors into the upstream section of the processing tube when the system is used in an application where the load varies and maximum turndown is required. The recycled vapor adds very little oxygen to the system, so the risk of explosion due to combustion of unburned fuel or the processed product is minimized.

The pulse combustor of the present invention employs a rotary valve which has an outer sleeve, an intermediate sleeve coaxially within the outer sleeve and coupled to a drive motor, and an inner sleeve coaxially within the intermediate sleeve. The end of the inner sleeve adjacent the drive motor is closed off to prevent thrust loading of the drive motor due to combustion backpressure. All three sleeves have radially oriented apertures which define an air intake and which generally align when the intermediate sleeve is in a prescribed rotational position. The speed of the drive motor may be varied to regulate the flow of air pulses through the rotary valve. This allows the operating frequency of the pulse combustor to be varied as the application requires. An oxidizer, e.g., air flowing into the rotary valve and toward the combustion chamber passes through an annular "air diode" constructed so that fluid flow from the outlet end toward the inlet end is impeded to a greater extent than a fluid flow from the inlet end toward the outlet end, thus reducing backpressure on the rotary valve and greatly increasing valve life. The rotary valve also eliminates the use of a substantial percentage of the energy from the combustion process to pump the combustion air required for the succeeding fuel detonations.

To reduce the corrosive effects of the hot combustion gases, the combustion chamber and intermediate tail pipe are constructed of ceramics. This is made possible by mounting the pulse combustor so that bending moments and thermal stresses on the individual components are minimized. Bending moments are eliminated by putting the pulse combustor into longitudinal compression in the combustor mounting cell and by having a strongback assembly transmit externally the compressive forces at the junction of the combustion chamber and the intermediate tail pipe where bending moments would occur. Thermal stresses are minimized by constructing the combustion chamber and initial tail pipe as conical and tubular sections without apertures, flanges or other rough areas. This construction also eliminates the necessity of casting the components as thick-walled sections which must then be machined to form flanges, apertures, etc. This process wastes expensive ceramic material, requires extensive labor and the use of sophisticated tooling and cutting techniques. By eliminating these significant additional costs, a corrosion-resistant pulse combustor constructed of ceramic materials becomes commercially feasible.

Operating flexibility and safety are enhanced by control systems which regulate the product feed rate, the system firing rate, the system flow rate, and the operating frequency of the pulse combustor. During normal operation the fuel nozzles in the system may be set to fire on air-atomized oil which further enhances safety by ensuring that detonation occurs on time due to the initial combustion that takes place between the oil and the atomizing air as the mixture is discharged into the hot combustion chamber. Finally, noise suppression equipment enhances safety by suppressing external noise to a level which exceeds OSHA standards.

DETAILED DESCRIPTION OF THE PREFERRED EMBODIMENTS

Overview

Figure 1:
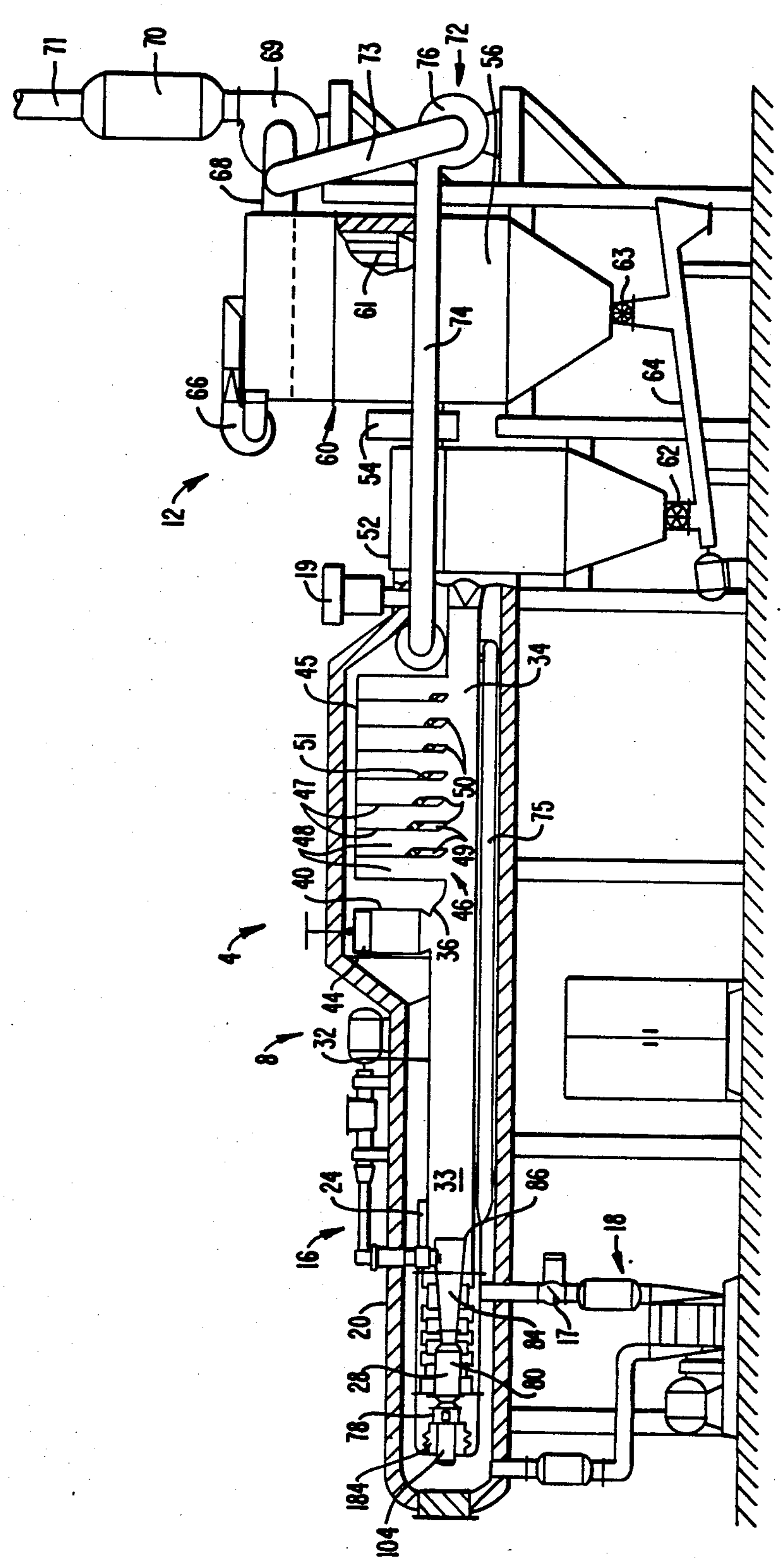
FIG. 1 is a side cross sectional view illustrating a preferred embodiment of the invention.

FIG. 1 shows the novel pulse combustion energy system generally designated as 4. Pulse combustion energy system 4 includes a processing section 8 and a receiving section 12. A product feed system 16 is coupled to processing section 8 for introducing material to be processed into processing section 8, and an air pump assembly 18 having a combustion air control damper 17 provides combustion air to the system by drawing air through an air inlet filter silencer 19.

Processing section 8 includes an outer shell 20 which is lined with sound absorbing materials to reduce the external system noise level. Disposed within outer shell 20 is combustor mounting cell 24 within which is mounted a pulse combustor 28.

Also disposed within outer shell 20 and coupled to pulse combustor 28 is a processing tube 32 having an upstream section 33 and a discharge section 34. Discharge section 34 has a constriction 36 so that the sonic pulse from pulse combustor 28 is partially reflected back, establishing in part a pattern of standing waves. Upstream of constriction 36 is an adjustable wave tuner 40 having a piston 44 which may be adjusted from the exterior of outer shell 20. Adjustable piston 44 allows the operator to set the amplitude of the standing waves from a maximum value down to a point where the reflected waves are fully dampened and no standing waves are produced.

Downstream of constriction 36 is a baffle assembly 46 which is designed to suppress the high intensity sound before the vapor and processed particles flowing through processing tube 32 enter receiving section 12. Baffle assembly 46 comprises a baffle housing 45 having a plurality of movable sound partitions 47 therein which define a plurality of sound suppression chambers 48. Sound partitions 47 may be axially adjusted to alter the volume of sound suppression chambers 48 for a particular application. A variable length upper portion 51 of each sound partition 47 further alters the volume of sound suppression chambers 48. At the bottom of each partition 47 is a deflector 49 which is shaped to effect a prescribed constriction and rate of opening for each sound suppression chamber 48. A lower surface 50 of each deflector 49 is shaped to ensure that the particles flowing through processing tube 32 are deflected away from the entrance to each chamber 48.

Coupled to the discharge section 34 of processing tube 32 is receiving section 12 including a first cyclone collector 52 which, in turn, is coupled through a silencer 54 to a second cyclone collector 56 having a bag house 60 including fabric bags 61 disposed on the top thereof. Cyclone collectors 52 and 56 are fully insulated to reduce the noise on their exterior. At the bottom of each cyclone collector 52, 56 are star valves 62, 63, respectively, for the discharge of a processed product to a processed product conveying system 64. Disposed on the top of second cyclone collector 56 is a blowback fan 66 for intermittently blowing air counterflow through fabric bags 61.

Coupled to an outlet 68 of second cyclone collector 56 is an induced draft fan 69 designed to pull the vaporized moisture and combustion products through receiving section 12 and then push them through an exhaust silencer 70 and through a stack 71. Also coupled to outlet 68 is an optional recycling section 72 having conduits 73 and 74, a recycle air feed tube 75, and a recycle fan 76 for recycling the vapor stream flowing through second cyclone collector 56 to upstream section 33 of processing tube 32 when the pulse combustion energy system is used in an application where the load varies and maximum turndown is required. Recycling section 72 may be optionally coupled to the outlet of first cyclone collector 52 if desired.

Rotary Valve

Figure 2A:
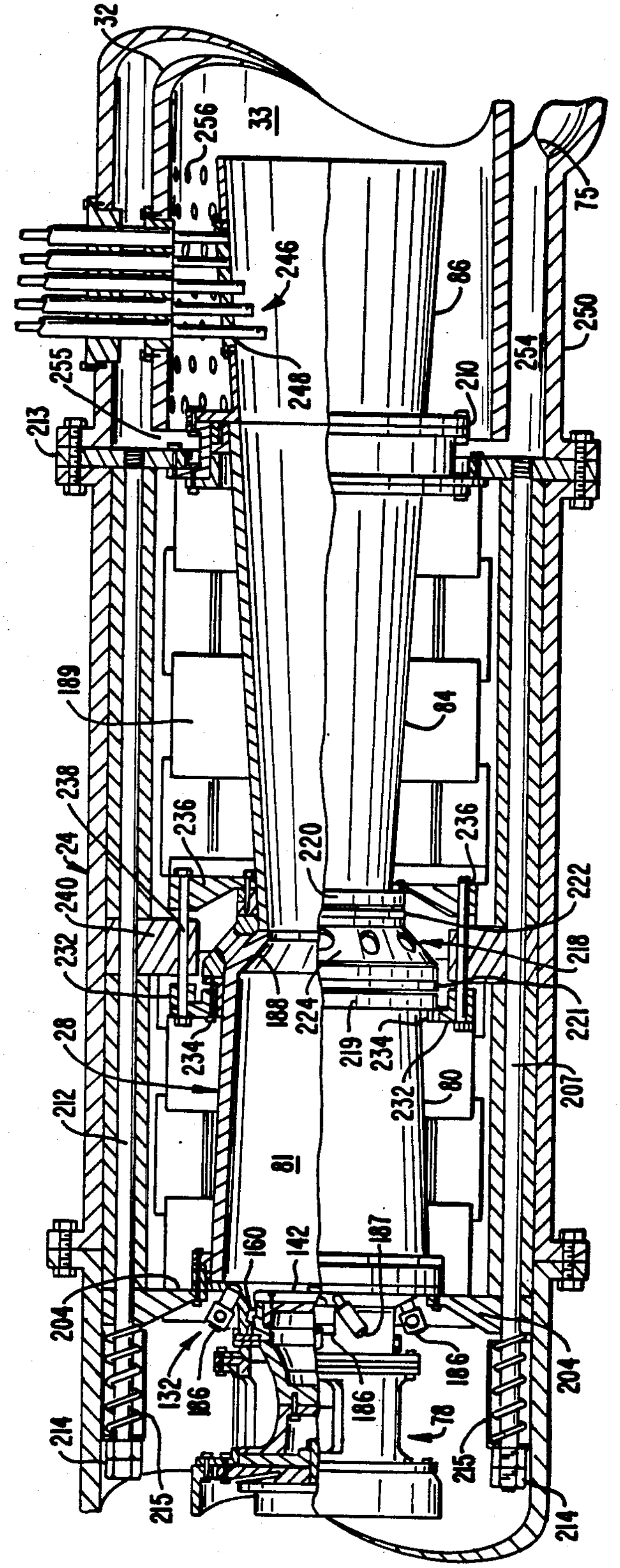
FIG. 2A is a side cross sectional view of the pulse combustion engine of FIG. 1.

As shown in FIG. 2A pulse combustor 28 generally comprises a rotary valve 78, a combustion chamber sleeve 80 whose interior defines a combustion chamber 81, an inner tail pipe 84 and an outer tail pipe 86.

Figure 3A:
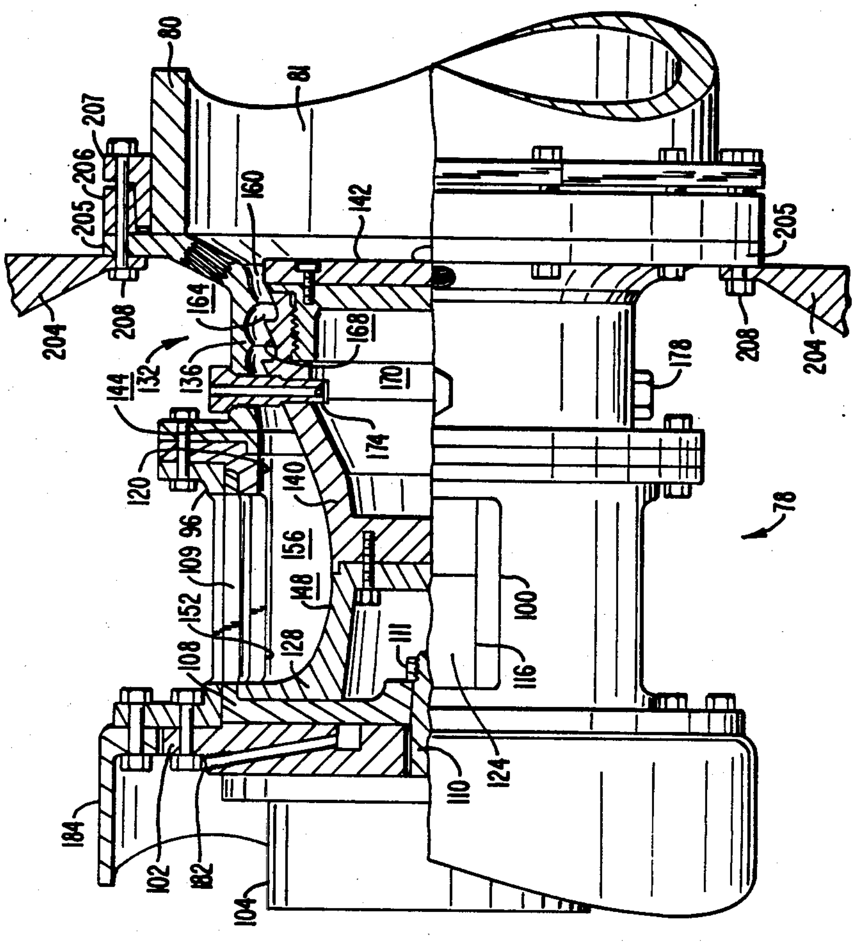
FIG. 3A is a side cross sectional view of the rotary valve used in the pulse combustion engine of FIG. 2A.
Figure 3B:
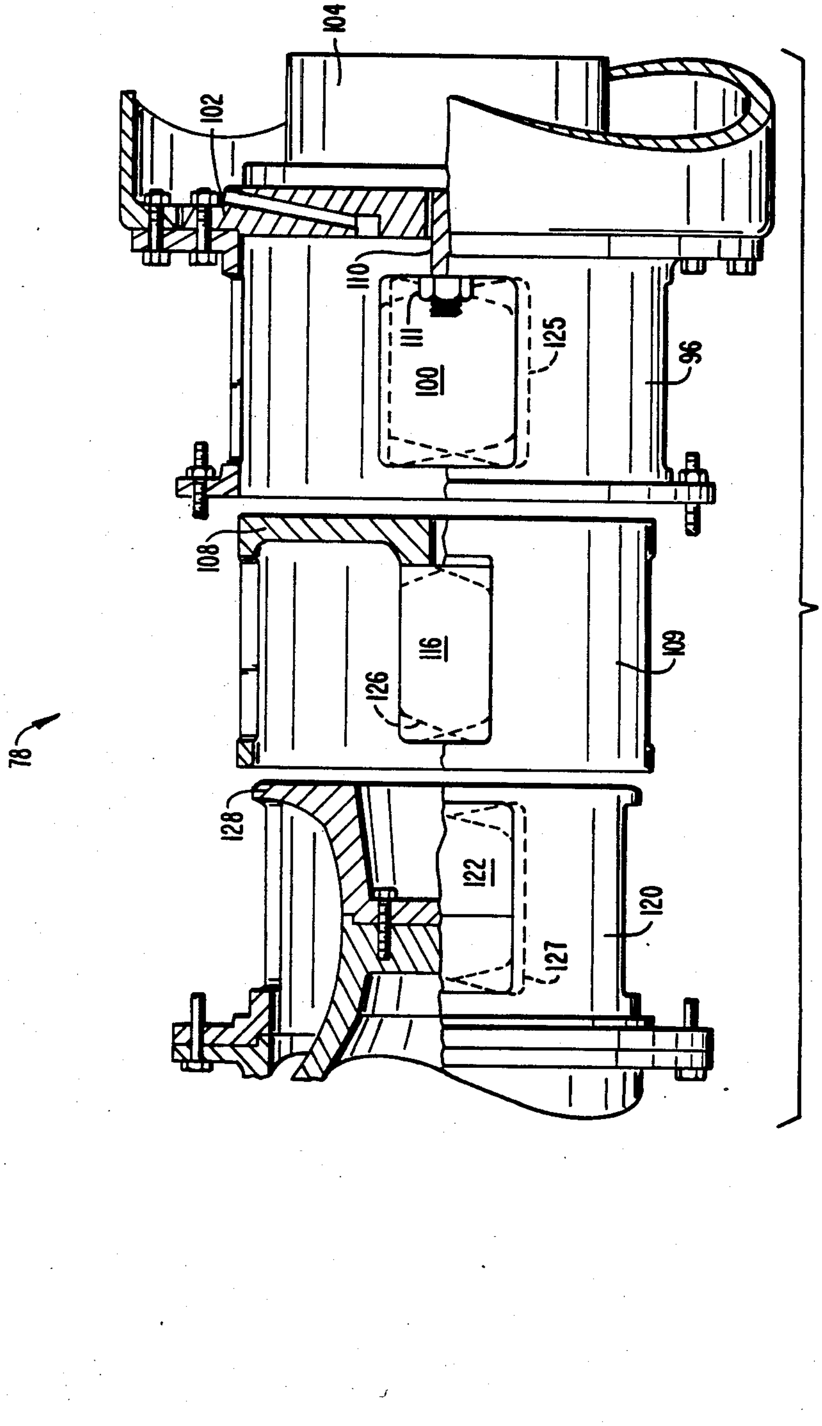
FIG. 3B is a side cross-sectional exploded view of the outer, intermediate, and inner sleeves of the rotary valve used in the pulse combustion engine of FIG. 2A.

As shown in FIGS. 3A and 3B, rotary valve 78 has an outer sleeve 96 having a plurality e.g. four apertures 100 of a prescribed geometry which are equally spaced or disposed in any manner around the perimeter thereof which results in a balanced structure. Outer sleeve 96 is affixed to a face plate 102 of a valve motor 104. Disposed coaxially within outer sleeve 96 is a valve rotor defined by a drive plate 108 and an intermediate sleeve 109 attached thereto. Drive plate 108 is coupled to valve motor 104 through a motor shaft 110 and shaft nut 111. Intermediate sleeve 109 has a plurality e.g. four apertures 116 of a prescribed geometry which are equally spaced or disposed in any manner around the perimeter thereof which results in a balanced structure. Apertures 116 generally align with outer sleeve apertures 100 when intermediate sleeve 109 is in a prescribed rotational position. As used herein and throughout the specification and claims, apertures generally align whenever they form a common opening of any shape or size.

Disposed coaxially within intermediate sleeve 109 is an inner sleeve 120 having a plurality, e.g. four apertures 122 of a prescribed geometry equally spaced or disposed in any manner around the perimeter thereof which results in a balanced structure. Inner sleeve 120 usually has the same number of apertures as outer sleeve 96, and apertures 100 in outer sleeve 96 are generally aligned with them. In some cases it may be advantageous to advance or retard apertures 100 in relation to the apertures 122 in inner sleeve 120 to obtain optimum performance. Apertures 100, 116 and 122 define an air intake 124 for valve 78 as shown in FIG. 3A.

Apertures 100 are also designed to be modified as necessary to allow the valve capacity coefficient $C_v$ of rotary valve 78 to vary predictably as the air intake 124 opens and closes to match the engine performance needs. They may be shaped, as shown by dotted lines 125 in FIG. 3B, to allow a greater or lesser air flow as air intake 124 initially opens, or they may be shaped to allow a greater or lesser air flow just as air intake 124 closes. In other words, apertures 100 have the necessary shape to provide the engine with the desired air intake flow rate and characteristics. The apertures in intermediate sleeve 109 or inner sleeve 120 likewise may be shaped to adjust the engine breathing rate as shown by dotted lines 126 and 127, respectively.

Adjacent to drive plate 108 and coupled to inner sleeve 120 is a backplate 128 for preventing the back pressure from combustion chamber 81 from pressurizing drive plate 108. This protects motor shaft 110 and shaft nut 111 while preventing any thrust loading of valve motor 104.

As shown in FIG. 3A, located adjacent to outer sleeve 96, intermediate sleeve 109, and inner sleeve 120, opposite motor 104, is a valve outlet section 132 comprising an outer portion 136, coupled to combustion chamber sleeve 80 and inner sleeve 120, and an inner portion 140 disposed coaxially within and radially spaced from outer portion 136. Inner portion 140 is coupled to backplate 128 at one end and to a flame stabilizer 142 at the other end. Flame stabilizer 142 is preferably constructed of ceramics.

An outer surface 144 of inner portion 140, an outer surface 148 of backplate 128, and an inner surface 152 of inner sleeve 120 together define an annular air chamber 156 in fluid communication with an annular "air diode" 160 formed by an inner surface 164 of outer portion 136 and an outer surface 168 of inner portion 140. The shape of annular air diode 160 is such that it will impede the flow of gas from combustion chamber 81 toward air chamber 156 to a greater extent than the flow of gas from air chamber 156 toward combustion chamber 81. This is accomplished by scalloping surface 164 and by forming surface 168 as a series of waves as shown in FIG. 3A.

Annular air chamber 156 is designed to minimize the air volume between the combustion chamber 81 and the air intake. This reduces any cushioning effects this volume might have on the shock waves which are reflected towards the valve 78 during the detonation phase of the pulse combustor cycle.

Disposed within inner portion 140 is a cooling chamber 170 having a cooling inlet 174 and a cooling outlet 178 so that a cooling medium flowing through cooling chamber 170 helps cool the rotary valve/combustion chamber junction during operation.

To provide further cooling an air inlet 182 is provided to supply air to the junction of drive plate 108 and face plate 102. The air flows toward and through the annulus defined by the inner surface of outer sleeve 96 and the outer surface of intermediate sleeve 109 and ultimately passes through apertures 116 and 122 in intermediate sleeve 109 and inner sleeve 120, respectively, and into air chamber 156.

As shown in FIG. 1, rotary valve 78 is mounted to the front of the pulse combustor 28 and located in the combustor mounting cell 24. The rotary valve motor 104 is also mounted inside the combustor mounting cell 24, but an expansion joint 184 provides an airtight seal between the motor 104 and the inside of the pulse combustor mounting cell 24. Expansion joint 184 also takes up any expansion due to heat buildup in the combustor during operation.

Pulse Combustor

FIG. 2A illustrates the remaining sections of pulse combustor 28. Located adjacent to valve outlet section 132 is combustion chamber sleeve 80 the interior of which defines combustion chamber 81. Combustion chamber 81 is in fluid communication with the annular air diode 160 of valve outlet section 132. Four fuel nozzles 186 and two igniters 187, mounted adjacent to two of the fuel nozzles 186, are disposed circumferentially on valve outlet section 132 for supplying fuel and ignition energy to combustion chamber 81. Combustion chamber sleeve 80 terminates in a tapered combustion chamber exit 188. Adjacent combustion chamber exit 188 is inner tail pipe 84 and outer tail pipe 86, respectively. A radiation shield 189 is disposed circumferentially around combustion chamber sleeve 80 and inner tail pipe 84 to protect combustor mounting cell 24 against the extreme temperatures generated by these sections. During normal operation, incoming air is heated by radiation shield 189 as the air flows toward rotary valve 78, and the heated air recycles the combustor 28 surface heat losses back to the pulse combustion process for increased efficiency.

The combustion chamber sleeve 80, the flame stabilizer 142, and the inner tail pipe section 84 of the pulse combustor 28 are subjected to the highest temperatures in the system. All flanges, apertures and other rough features have been eliminated from these sections to reduce thermal stress concentrations which can lead to a cracking of the parts, which renders them useless. Combustion chamber sleeve 80 and inner tail pipe 84 may then be constructed as smooth conical and tubular sections. This makes it commercially feasible to use high temperature ceramic materials to fabricate these parts, since the need for thick wall casting and extensive machining is eliminated. The ceramic parts significantly improve the life of this pulse combustor over others presently known. Accordingly, there are three different ways of fabricating these parts listed in the order of preference:

A. They may be fabricated entirely out of high temperature ceramic materials such as Silicon Nitride, Silicon Carbide, Alumina Oxide, or Mullite-type ceramics. Different engine sections in the same engine assembly may be made from different ceramics. It is also possible to metallize the inside surface of the ceramic parts with catalytic metals such as platinum (or other metals) which improve the combustion process and reduce pollution.

B. They may be fabricated or cast as thin walled sections made from Inconel or high temperature stainless steel and lined with thin walled ceramic segments which are attached to the inside surfaces of the metal shells. The same type of ceramics as described in A, above, may be used with this fabrication method. This system is preferable when the engine parts are larger than the equipment available to manufacture the individual ceramic sections. Again, the inside surface of the ceramic inserts may be metallized with catalytic metals such as platinum to improve the combustion process.

C. They may be fabricated or cast as thick walled sections made from Inconel or high temperature stainless steel and coated with high temperature Zirconia based coatings. The Eirconia coating is about 10–15 thousandths of an inch thick and will reduce the metal surface temperature by more than 200° F.

In addition to eliminating thermal stresses by fabricating the components without stress-producing features, the mounting system must substantially eliminate all bending moments on these sections in order to reduce the probability of failure of the parts due to mechanical stresses. The mounting system illustrated in FIGS. 2A, 3A and 4 achieves this result.

As shown in FIG. 3A, a bracket 204 applies pressure to a flange 205 radially extending from outer portion 136 of outlet section 132. Flange 205 is coupled to combustion chamber sleeve 80 through a ring 206 and a wedge 207, and the assembly is secured by bolts 208. As shown in FIG. 2A, bracket 204 longitudinally compresses combustion chamber sleeve 80 and inner tail pipe 84 against a flange 210 of outer tail pipe 86. Bracket 204 is secured by compression bolts 212 which thread into a flange 213 and are secured by nuts 214 and expansion springs 215. Expansion springs 215 allow for thermal expansion of pulse combustor 28 during operation.

Figure 4:
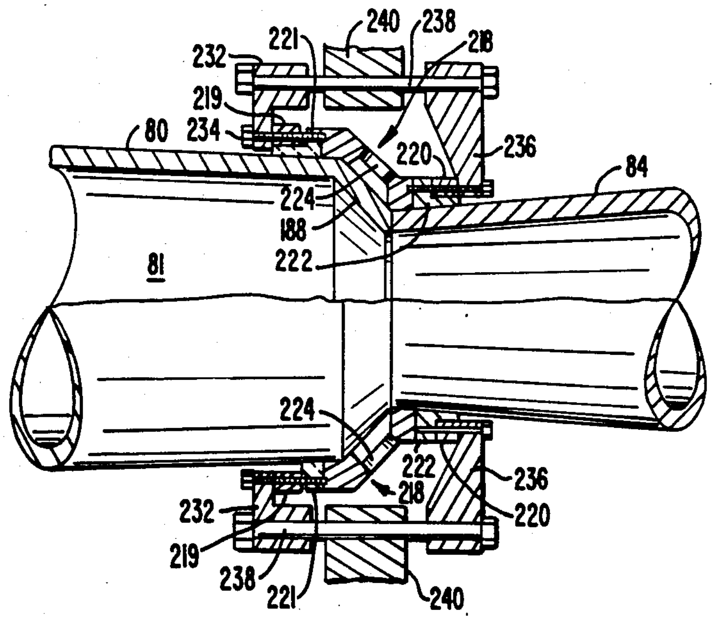
FIG. 4 is a detailed view of the coupling mechanism for the combustion chamber and inner tail pipe of FIG. 2A.

To avoid bending moments at combustion chamber exit 188, a strongback assembly 218, illustrated in FIG. 4, transmits externally the force which compresses combustion chamber sleeve 80 and inner tail pipe 84 towards each other. Strongback assembly 218 comprises stainless steel rings 219, 220, which clamp stainless steel wedges 221, 222 respectively to combustion chamber sleeve 80 and inner tail pipe 84, respectively. A strongback ring 224 is disposed between wedges 221 and 222.

Strongback assembly 218 is secured to a bracket 232 by bolts 234 passing through bolt holes in ring 219 and wedge 221 and extending into strongback ring 224. Strongback assembly 218 is secured to a bracket 236 in a similar fashion. A pin 238 extends slidingly through brackets 232, 236 and a support bracket 240. Pin 238 allows the midsection of pulse combustor 28 to be supported while accommodating any thermal expansion during operation. Longitudinal compression of combustion chamber sleeve 80 is thus transmitted externally to wedge 221 and along strongback ring 224 to wedge 222 which in turn directs the longitudinal compression to inner tail pipe 84.

Figure 2B:
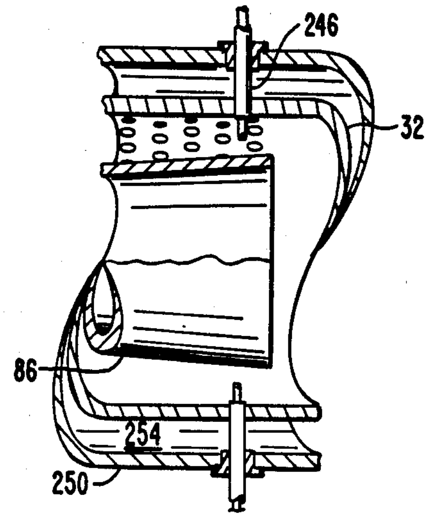
FIG. 2B is an alternative embodiment of the pulse combustion engine of FIG. 2A.

The outer tail pipe 86 will operate under different conditions than the other pulse combustor sections. It is subjected to much higher thermal stress loadings because the material to be processed enters the tail pipe through a plurality of nozzles 246 extending through a plurality of apertures 248 as shown in FIG. 2A. As a result, this section is not usually made from ceramic materials. The processed material is at much lower temperatures than the gas stream so the tail pipe surface must accommodate high temperature differentials. It is preferably made of Inconel or high temperature stainless steels and may be coated with high temperature Zirconia. It is within the scope of the present invention to dispose the nozzles 246 externally of tail pipe 86, as shown in FIG. 2B, and flow the material to be processed generally parallel to tail pipe 86. This arrangement is preferable in systems used to dry material, such as tomatoes, wherein a component of the material, such as sugar, tends to accumulate at the nozzle openings when the nozzles are disposed in the tail pipe. Eliminating apertures 248 in this embodiment allows outer tail pipe 86 to be fabricated from ceramic materials. It is also within the scope of the present invention to use only one nozzle 246 when desirable.

As shown in FIG. 2A, combustor mounting cell 24 mounts to processing tube 32 so that outer tail pipe 86 is coaxially disposed within and radially spaced from the inner surface of processing tube 32.

Part of the upstream section 33 of processing tube 32 is disposed coaxially within and radially spaced from a recycle air sleeve 250 forming an annular air passage 254. Coupled to recycle air sleeve 250 and in fluid communication with annular air passage 254 is recycle air feed tube 75 which receives recycled vapor from receiving section 12. The recycled vapor flows from annular air passage 254 and into processing tube 32 through a plurality of slots 255 circumferentially disposed on the surface of processing tube 32.

Since the natural frequency of a pulse combustor depends in part on the length of the tail pipe, it is desirable in some cases to ensure that processing tube 32 does not have the effect of being an extension of outer tail pipe 86. To accomplish this, a plurality of apertures 256 are circumferentially disposed on the surface of processing tube 32 for forming a decoupler between outer tail pipe 86 and processing tube 32. Apertures 256 may be selectively covered with plates (not shown) to vary the decoupling effect.

Flame Safety System

Figure 5:
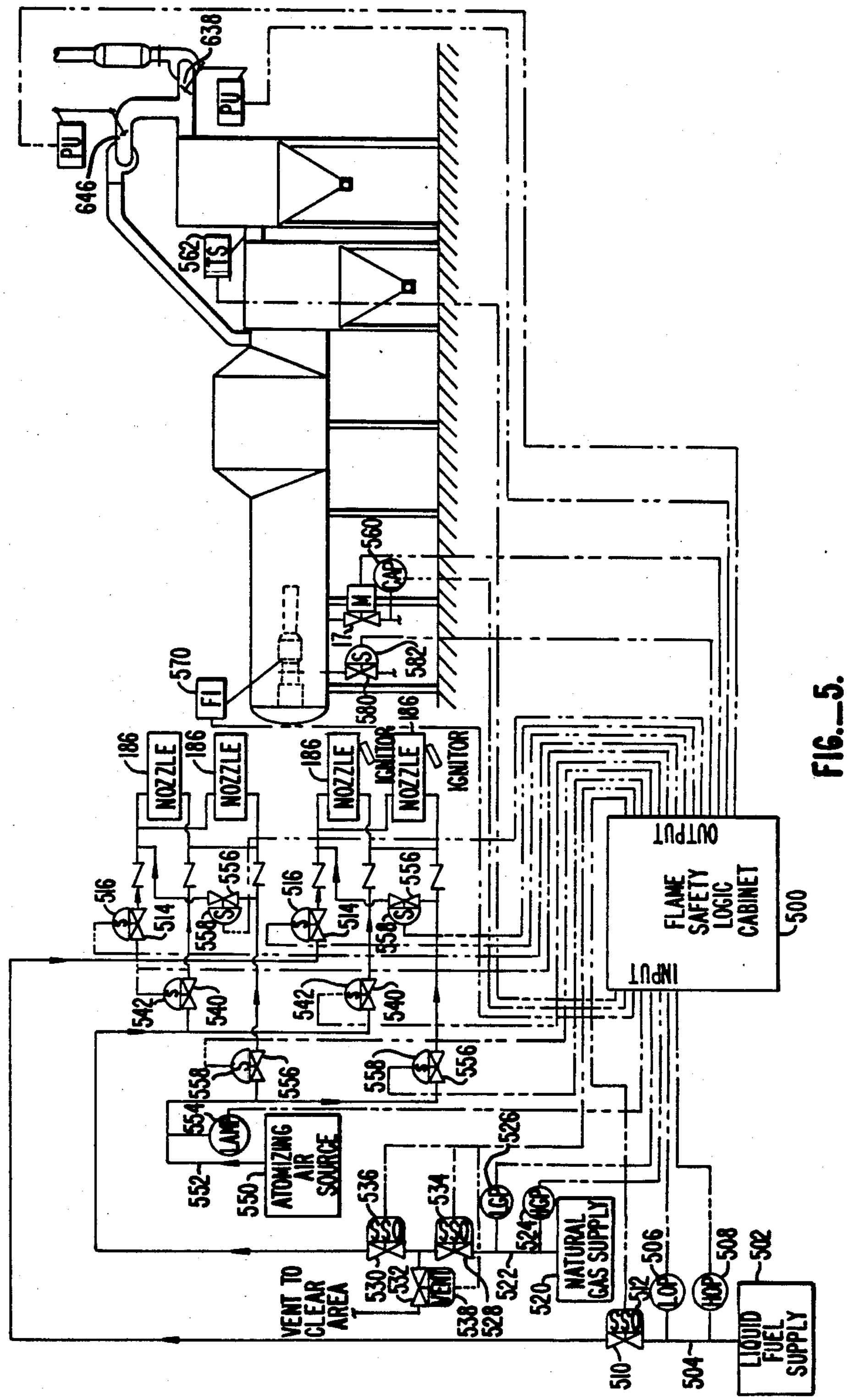
FIG. 5 is a schematic diagram of the flame safety system used in the preferred embodiment of the invention.

The pulse combustion energy system is started, operated and shut down under the supervision of a flame safety system illustrated in FIG. 5. The flame safety system is controlled by a programmable microprocessor or a relay logic system located in a logic cabinet 500. Logic cabinet 500 receives signals from a plurality of sensors, and these signals are used to control the fuel, fuel drain, combustion air, and atomizing air systems described below.

A liquid fuel supply 502, preferably No. 2 fuel oil, is coupled to a fuel line 504 which is monitored by a low oil pressure switch 506 and high oil pressure switch 508. Disposed in fuel line 504 is a safety shut-off valve 510 which is controlled by a safety shut-off solenoid 512. Fuel line 504 passes through shut-off valves 514, controlled by shut-off solenoids 516, and then to nozzles 186.

A natural gas supply 520 is coupled to fuel line 522 which is monitored by high gas pressure switch 524 and low gas pressure switch 526. Disposed in fuel line 522 are safety shut-off valves 528, 530, and vent valve 532 which are controlled by safety shut-off solenoids 534, 536, and vent solenoid 538, respectively. Fuel line 522 passes through shut-off valves 540, controlled by shut-off solenoids 542, on its way to nozzles 186.

An atomizing air source 550 is coupled to an atomizing air line 552 which is monitored by a low atomizing air pressure switch 554. Atomizing air line 552 passes through shut-off valves 556, controlled by shut-off solenoids 558, and proceeds to nozzles 186.

A low combustion air pressure switch 560 for monitoring combustion air pressure is coupled to air intake assembly 18 below combustion air control damper 17, and a system high temperature switch 562 is coupled to the processing tube to detect overheating in the system.

The flame safety system also has a flame indicator 570 for detecting the combustion process. In a pulse combustion system, flame indicator 570 may be either an optical scanner for detecting the ultraviolet or infrared light waves radiating from the flame, or a pressure sensor for measuring a positive pressure pulse which is produced by the detonation of fuel in the combustion chamber. The pressure sensor is calibrated so that it will detect pressures in excess of the supply pressure of the combustion air blower so that it will only measure the component of the total pressure supplied by the burning of the fuel.

The flame safety system will shut off fuel to the pulse combustor under the following conditions: low or high fuel pressure, low combustion or atomizing air pressure, flame out, or high system temperature. When oil is being used, safety shut-off solenoid 512 will close safety shut-off valve 510, and if gas is being used, safety shut-off solenoids 534 and 536 will close safety shut-off valves 528 and 530, respectively, and vent solenoid 538 will open vent valve 532.

The flame safety system also controls the combustion chamber fuel drain system. The pulse combustion system has a special drain valve 580 mounted on outer portion 136 of rotary valve 78, which is coupled to a solenoid 582. The pulse combustor drain valve 580 is opened by the flame safety system whenever there is an attempt to ignite oil either during start-up or during fuel changeover. When flame indicator 570 detects the ignition of the fuel oil, the flame safety logic closes the combustion chamber drain valve 580 and any excess fuel will have been removed from the chamber.

Process Control System

Figure 6:
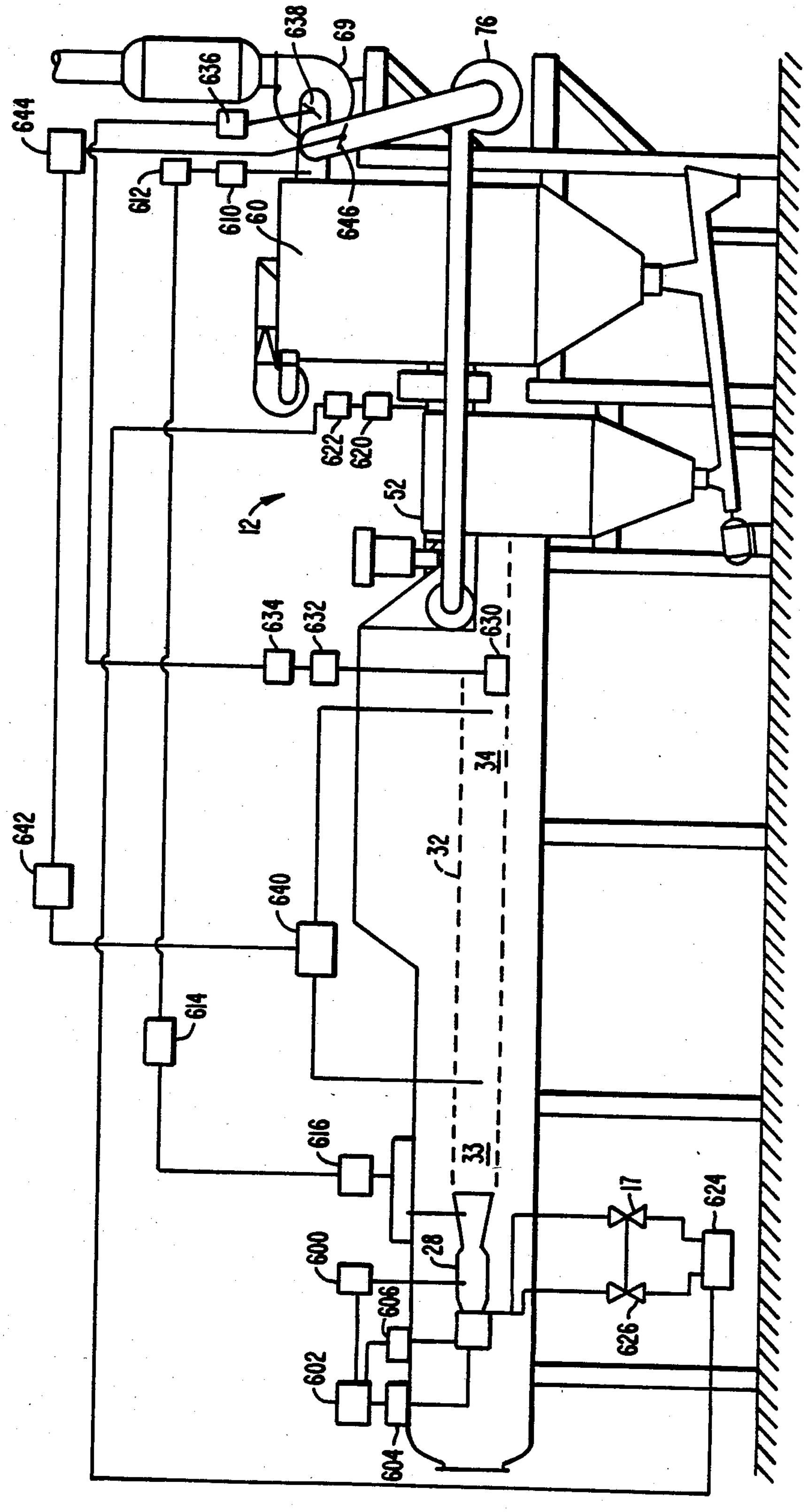
FIG. 6 is a schematic diagram of the operating control system used in the preferred embodiment of the invention.

As shown in FIG. 6, the Pulse Combustion Energy System has process controls which allow for automatic control of the system. These controls are designed to check process set points and adjust the operating parameters to maintain the set points. The operating set points are adjusted depending on the product to be processed through the system, the rate at which it is processed, etc.

One control loop sets the speed of the rotary valve 78 to vary the operating frequency of the pulse combustor 28. A frequency sensor 600 is used to measure the combustion pulse rate which in turn transmits a signal to a controller 602 where the operating frequency set point can be adjusted. Frequency sensor 600 may alternatively be used to measure the rate of air pulses entering combustion chamber 81. The controller 602 sends a signal to a motor control unit 604 to adjust the valve speed and receives a feedback signal from a valve motor tachometer 606 to verify the actual valve RPM. Controller 602 and/or control unit 604 may be an integral part of rotary valve 78. The adjustment at controller 602 allows the rotary valve 78 speed to be set at the natural frequency of pulse combustor 28 or slightly off frequency, depending upon the product being processed. This feature is included because, as the rotary valve 78 speed approaches the natural frequency of the pulse combustor 28, the sonic pressure wave is enhanced, which may increase the processing speed of some products above acceptable levels and cause the processed particle temperature to increase. Products which are more difficult to dry would require the maximum sonic pressure wave and rotary valve 78 is operated at a rate which matches the natural frequency of the engine to achieve this result.

A separate control loop is used to establish the product feed rate and adjust the feed rate according to the moisture content. When the pulse combustion system is operating, it is necessary to keep the baghouse 60 temperature above the dew point (approximately 212° F. in dewatering applications) so that condensing water will not cause the fine particles caught on the bag surface to become wet and stick to the bags. Since the system heat input is set by the desired production rate and it is difficult to know at any instant what the moisture content of the feed will be, a temperature sensor 610 is mounted in the discharge of the baghouse 60. From the sensor 610, a temperature transmitter 612 sends a signal to a temperature controller 614 which sets the baghouse 60 discharge temperature about 10° F. above the dew point. The controller 614, in turn, sends a signal to the variable speed motor controller 616 which operates the product feed system 16, setting the speed at which the product is fed to the pulse combustion system. If the product has less moisture, the feed rate is increased. If the product has more moisture, the feed rate is reduced so that the water to be removed from the product by the system is not greater than the heat which is available to evaporate the water.

A control loop is also provided to allow the operator to set the system firing rate and protect the system from overheating if the product feed should be temporarily interrupted. A temperature sensor 620 measures the temperature at the discharge of the first cyclone collector 52. From the sensor 620 a temperature transmitter 622 sends a temperature signal to a temperature controller 624 where the operator can either establish a control set point or set the system firing rate by hand. The signal from controller 624 sets the position of a fuel control valve 626 and the combustion air control valve 17. The valves both have positioners to tell controller 624 what percentage the valves have opened or closed. This system may also be used to set the pulse combustion system firing rate if the equipment is to be operated at less than full capacity. Also, if a particular product is hard to dewater or takes longer to dewater, this control loop cuts back the firing rate when the first cyclone collector 52 temperature becomes too high. It also cuts back the firing rate if the product feed is interrupted resulting in an increase in temperature. If this control loop cannot cut firing rate sufficiently to maintain the cyclone temperature below a prescribed level, then the flame safety system shuts down the system when the system high temperature switch 562, shown in FIG. 5, activates.

A control loop is also provided to control the pressure in processing tube 32. The pressure must be controlled to insure that the proper system pressures are maintained downstream of the pulse combustor 28 and in receiving section 12. This in turn insures that the flow rate through the collectors is within limits for optimum system performance. The control loop consists of a pressure indicator 630 which is located at the discharge section 34 of processing tube 32 and which senses the system pressure. The signal from the pressure indicator 630 goes to a pressure transmitter 632 and on to a pressure controller 634 which is set to maintain the pressure at the end of processing tube 32. The controller 634 then sends a signal to a power unit 636 that drives an inlet vane control damper 638 on the induced draft fan 69.

If the pulse combustion system is used in an application where the load varies and maximum turndown is required, an additional control loop maintains the vapor velocities in the processing tube 32 at the reduced system firing rates. The control loop has a differential pressure transmitter 640 which senses the pressure drop through the processing tube which in turn reflects the proper velocity. The transmitter 640 sends a signal to a differential pressure controller 642 where the operator can adjust the differential pressure set point according to the desired processing tube velocity. The differential pressure controller 642 sends a signal to a power unit 644 which adjusts the setting of an inlet vane control damper 646 on the recycle fan 76. At the regular firing rate, the velocity in the processing tube 32 would be higher than the set point so the inlet vane control damper 646 is normally closed. As the firing rate is reduced, the processing tube 32 velocity falls until the set point is reached. Then the controller 642 starts to open the inlet vane control damper 646 to add recycle air to the processing tube 32 so that the minimum conveying velocity is maintained. The recycle stream is made up of vaporized water and products of combustion which are 10 degrees above the dew point. This means that the recycle stream will not reduce the system thermodynamic efficiency nor will it add oxygen to the system which might degrade the particles in the processing tube or create a risk of explosion by mixing added oxygen with unburned combustion fuel or with the fine particles of a combustible product being processed.

Operation

The pulse combustion energy system is started, operated, and shut down under the supervision of the flame safety system. This system has the logic to control the light-off sequence timing, to check all permissive limit switches and open the appropriate fuel valves in the proper order during the system start-up. During the system operation, the flame safety system constantly checks that the combustion process is functioning normally and ensures that all the fuel, combustion air and other required services are within acceptable limits to support the combustion process. The system is also used to properly sequence the shut down of the pulse combustor both in the event an emergency situation develops or in the normal process of terminating the system operation.

The pulse combustion energy system operation begins with energizing the flame safety system at cabinet 257. Then air pump assembly 18, the rotary valve 78, the induced draft fan 69, the recycle fan 76 and the other motors in the system are started. The flame safety system then checks and verifies that all the limit switches show that the system's services are within design specifications. With all the permissives set, the flame safety system drives combustion air control damper 17, inlet vane control damper 638 and inlet vane control damper 646 to the full open position prior to the start of the engine purge. At this point, the engine purge timing begins. The purge timer starts, and the rotary valve 78 speed is set to the proper frequency for initial engine ignition at low fire. Air pump assembly 18 draws outside air through air inlet filter silencer 19 and into air pump assembly 18 where its pressure is increased by up to 6 PSI. From the air pump assembly 18 the air flows into combustor mounting cell 24 where it passes inside the radiation shield 189. The combustion air then enters the rotary valve 78 on its way to the combustion chamber 81. The combustion chamber receives a minimum of five complete air charges during the purge cycle.

When purging is complete, the flame safety system drives combustion air control damper 17, inlet vane control damper 638 and inlet vane control damper 646 to the ignition position. When the dampers are proven to be in the ignition position, the flame safety system energizes the two (or more) igniters 187 and opens the gas safety shut-off valves 528, 530 while closing the vent valve 532. The system also opens the gas solenoid valve 540 that supplies gas to the two (or more) fuel nozzles 186 which are adjacent to the two (or more) igniters 187. At this point the ignition timer starts and holds the safety shut-off valves 528, 530 open for the 10 second trial for ignition.

The pulse combustion cycle starts when an air pulse from the rotary valve 78 mixes with gas from the two nozzles 186 and the mixture explodes due to the ignition energy from igniters 187. When the fuel and air detonate, the pressure in the combustion chamber 81 increases, causing a back flow of the air in the chamber towards the closed rotary valve 78. As the back flow of air flows through air diode 160, surface 168 in air diode 160 causes the air flowing there along to reverse direction and flow transversely toward surface 164. The combination of the reverse momentum of this flow with the scalloped shape of surface 164 creates an artificial vena contracta which has the effect of constricting the flow through air diode 160 and reducing the back pressure on the closed rotary valve 78.

If the flame safety system detects the proper ignition of fuel with flame indicator 570, it leaves the safety valves open and allows the operator to open the gas solenoid valve 540 to the remaining fuel nozzles. On the other hand, if the flame indicator 570 fails to pick up a positive flame signal within the 10 second trial for ignition, the safety valves 528, 530 are closed and the system returns to its prepurge point in the system start-up program.

When all fuel nozzles 186 are operating and the flame safety system detects a normal flame, the system releases dampers 17, 638 and 646 to the combustion control system where the process controls set the pulse combustion firing rate.

The flame safety system also contains the logic and controls to allow a changeover from one fuel to another. Fuel nozzles 186 are designed to inject gas or liquid fuels or both. During normal operation the nozzles are set to fire on air atomized oil. Air atomized oil is preferable over prior art systems which use pressure-atomized mechanically injected fuel oil because the air atomized oil produces smaller oil drops which vaporize faster. This also ensures that detonation occurs on time due to the initial combustion that takes place between the oil and the atomizing air as the mixture is discharged into the hot combustion chamber.

The fuel changeover starts by firing all fuel nozzles 186 on natural gas. The flame safety system checks the oil and atomizing air limit switches to ensure they fit within specifications and then opens the combustion chamber drain valve 580. The operator opens shut-off valve 514 to allow oil to flow to two (or more) of the nozzles 186 which are firing natural gas. The natural gas atomizes the oil and the mixture immediately ignites. Within 10 seconds the combustion chamber drain valve 580 closes and the operator opens atomizer air valve 556 and closes shut-off valves 540 on the natural gas system. The atomizing air blows the remaining gas out of the fuel nozzles 186 and takes over the function of atomizing the fuel oil. The operator repeats the process and changes the remaining two (or more) nozzles 186 over to firing oil.

This ability to burn two fuels on the same nozzles gives the pulse combustion system additional flexibility over prior art systems in selecting fuels and firing modes. The new system can be set up to operate as follows:

(A) ALL NOZZLES FIRING AIR ATOMIZED OIL (B) ALL NOZZLES FIRING GAS ATOMIZED OIL (C) HALF NOZZLES FIRING AIR ATOMIZED OIL AND HALF NOZZLES FIRING GAS ATOMIZED OIL (D) HALF NOZZLES FIRING AIR ATOMIZED OIL AND HALF NOZZLES FIRING GAS (E) HALF NOZZLES FIRING GAS ATOMIZED OIL AND HALF NOZZLES FIRING GAS (F) ALL NOZZLES FIRING GAS

The combustion fuel is supplied to the combustion chamber 81 at low pressure (below 15 PSIG) so that its flow will be interrupted by the peak combustion pressures in the combustion chamber 81. This means that fuel flow is automatically timed to the pulse frequency of the combustion chamber 81 and the fuel system does not need a special valve which is timed to open and close in sync with the variable speed rotary valve 78.

The initial detonation releases heat and creates a pressure wave. The heat starts to heat up combustion chamber sleeve 80, inner tail pipe 84, and outer tail pipe 86 while the pressure wave stops the flow of the fuel gas and sends a pressure pulse down initial and outer tail pipes 84 and 86, respectively. The momentum of the combustion products moving down the tail pipes with the wave generates a partial vacuum in the combustion chamber that is in sync with the opening of the rotary valve 78. This draws additional charges of air and gas from the valve and the fuel nozzles 186 which mix rapidly. At this instant the rotary valve 78 closes and the mixture comes in contact with combustion products remaining from the previous cycle which, along with the hot combustion chamber walls, causes the ignition of the new fuel charge. The pulse combustor 28 typically cycles and detonates between 100 and 200 times per second. Each pulse sends a pressure wave, followed by a partial vacuum, down tail pipes 84 and 86.

During the unit start-up and during fuel changeover, the temperature in the combustor is likely to shift. This will change the operating frequency. Here the variable speed rotary valve 78 on the combustion air system can be set to follow the frequency change. This improves the safety as well as the reliability of the system.

Once the system is started up, a slurry, which can consist of up to 99% moisture, is sprayed into the outer tail pipe 86 where it comes into contact with the heat and sonic energy from the pulse combustion process. Nozzles 246 are oriented to effect a prescribed spray configuration so that the slurry is exposed to the hot gas pulses in a manner which maximizes drying effectiveness. As the mixture flows through processing tube 32, the water is mechanically driven or stripped off the solid particles in the feed by the sonic shock waves and, at the same time, the heat evaporates the moisture, thus completing the drying process in fractions of a second.

The processed particles then enter first cyclone collector 52 from which they are discharged through star valve 62 and into the dry product conveying system 64. The vapor, with a small percentage of the initial particulate loading, passes out of the first cyclone collector 52 and through silencer 54 into second cyclone collector 56. Second cyclone collector 56 further reduces the dust load in the vapor stream. Most of the remaining dust particles will drop to the bottom of second cyclone collector 56 from which they are discharged through star valve 63 and into the dry product conveying system 64.

At the top part of the second cyclone collector 56 is a baghouse 60 which has fabric bags 61 designed to remove the final and smallest particles from the vapor stream. The vapor stream moves up second cyclone collector 56 and through the fabric bags 61. The dust particles are deposited on the outside of the fabric bags 61 and the cleaned vapor stream is exhausted through the stack 71. To maintain the porosity of fabric bags 61, high volume low pressure vapor is intermittently blown counterflow through fabric bags 61 in reverse of the filtering action by blowback fan 66. The dust which has accumulated on fabric bags 61 is dislodged and falls to the bottom of the second cyclone collector 56 where it is discharged through star valve 63 and into the dry product conveying system 64.

As the system operates, the control system maintains proper valve speed, product feed rate, system firing rate, and vapor velocities to insure optimum performance.

The flame safety system is used to shut down the system if the combustion flame goes out, if the operating temperatures approach dangerous levels, or during normal shut down. A normal shut down starts with running all the feed material out of the slurry feed system. Then the pulse combustion engine 28 is set to low fire and the safety shut-off valves 510 and/or 528 are closed. All the system motors would be secured with the exception of air pump assembly 18, rotary valve 78 and the induced draft fan 69. If the system is firing oil, the atomizing air system would be left on until the atomizing air can be used to purge out the fuel nozzles 186 by opening valves 556. The airflow would burn out any remaining fuel and cool down the hot pulse combustion engine parts. After a short period the flame safety system would also secure the remaining motors and the system would be completely shut down.

Conclusion And Alternative Embodiments

While the above is a complete description of a preferred embodiment of the present invention, the rapid and efficient dewatering capabilities of the pulse combustion energy system also may be used to process a wide range of products if the system configuration is modified to meet specific needs of a product. The horizontal configuration shown in FIG. 1 of the application would normally be used for slurry type products with small particle sizes. In this configuration, the exhaust from the pulse combustor and the steam released in the drying process is used to convey the particles through the system.

Figure 7:
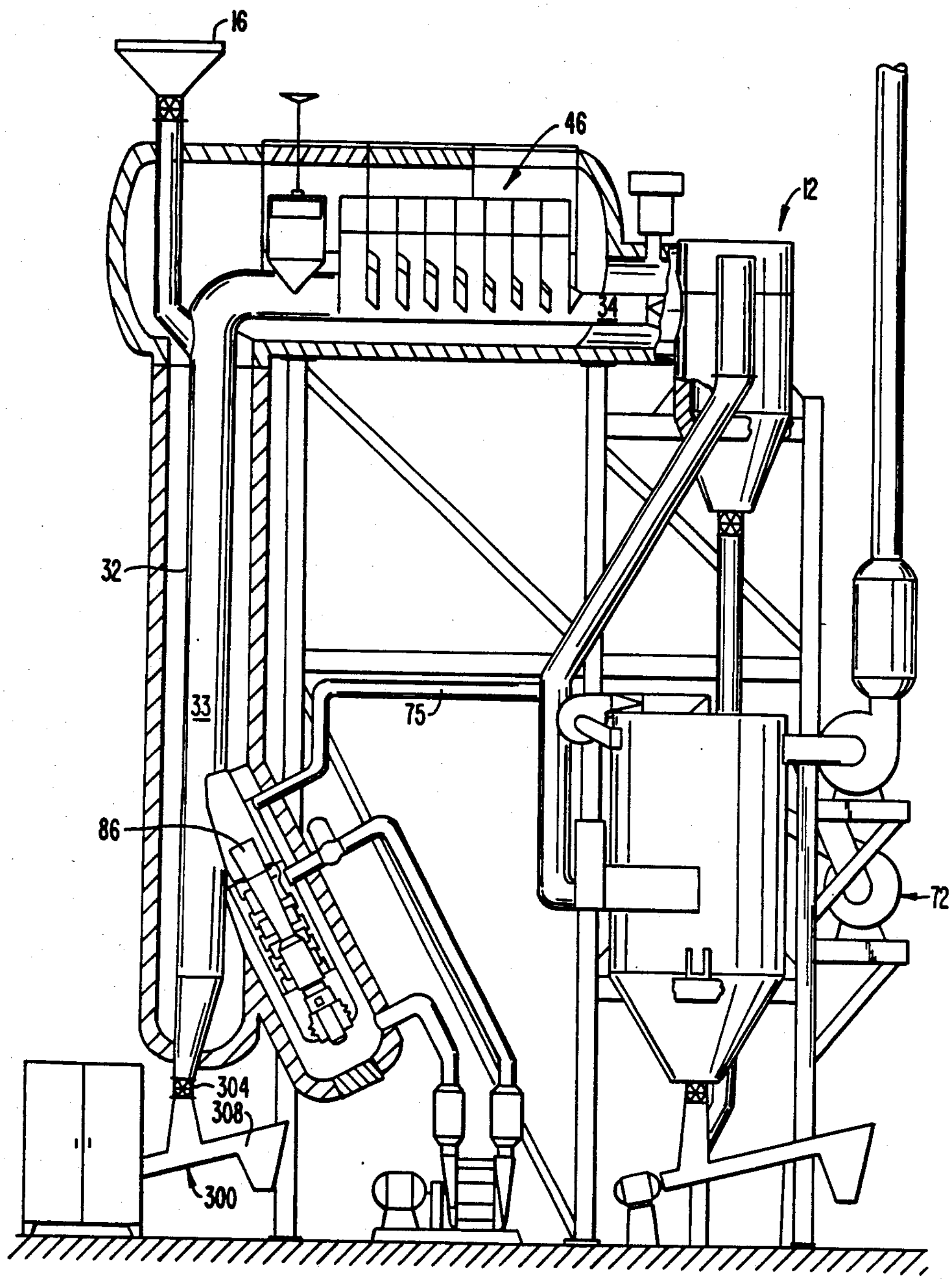
FIG. 7 is a side cross-sectional view illustrating an alternative embodiment of the invention.

If, however, a large particle must be processed which cannot be conveyed through the processing tube by the pulse combustor exhaust, then a vertical and counter flow model of the system may be used. This system is shown in FIG. 7. In this case the feed is introduced at the upper end of the vertical section of the processing tube 32 opposite the pulse combustor 28. The product feed is drawn towards the pulse combustor by gravity while the sonic energy and heat passes up towards the top of the processing tube 32.

As the product passes through the sonic waves and heat, the moisture turns to steam which increases the gas velocity in the processing tube. This velocity change does not affect the larger particles which continue to fall to the bottom of the processing tube from which they are recovered by the large particle recovery system 300, comprising star valve 304 and the large particle conveying system 308. The dust or smaller particles which may be in the feed, or which may be detached from the large particles during the drying process, are picked up by the exhaust and steam and are conveyed through the baffle assembly 46 and on to the receiving section 12 for recovery.

The vertical configuration may also operate as a parallel flow unit if a slurry is introduced into the pulse combustor exhaust by nozzles extending through outer tail pipe 86 as shown for the horizontal configuration of the system in FIG. 1.

The vertical configuration also has an optional recycling section 72, similar in theory and construction to the recycling section for the horizontal unit, and a control loop, similar to the one shown in FIG. 6, to establish the exhaust and steam velocity in the processing tube. This velocity may be altered in order to establish a distribution of particles which either fall to the bottom of the processing tube or are carried over to the receiving section 12, i.e., this control loop acts as a primitive separator. Also, this control loop determines product stay time in the processing tube which establishes the dryness of the final product.

The remainder of the vertical system is identical in function to the horizontal configuration of the system.

The pulse combustion energy system may be used for many different applications such as firing boilers, calcining minerals, vaporizing products for distillation, and other chemical processes. In these applications, the pulse combustor may operate with a liquid oxidizer, instead of a gaseous oxidizer such as air, flowing into rotary valve 78. In fact, it is within the scope of the present invention to use rotary valve 78 and pulse combustor 28 with any oxidizing agent - that is, any substance which oxidizes by taking up electrons to form a new molecule and in the process releases energy in the form of heat and pressure. Depending on the application, the pulse combustor may operate oxidizer rich, stoichiometrically, or in a reducing mode by varying the setting of combustion air control damper 17 in response to a gas analyzer (not shown) which samples the combustion products emitted from outer tail pipe 86.

The systems described herein are for dewatering, so the collection systems shown are specifically designed for dewatering applications. If the pulse combustion energy system were to be applied to another process then the downstream equipment would be selected accordingly. Consequently, the foregoing description should not be used to limit the scope of the invention which is properly set out in the claims.

What is claimed is:

1. A valve comprising:

an outer sleeve having a radially oriented aperture;

a rotatable intermediate sleeve disposed coaxially within the outer sleeve and having a radially oriented aperture being generally aligned with the outer sleeve aperture when the intermediate sleeve is in a prescribed rotational position;

means, coupled to the intermediate sleeve, for rotating the intermediate sleeve within the outer sleeve;

an inner sleeve disposed coaxially within the intermediate sleeve, defining a chamber with an upstream end and a downstream end, and having a radially oriented aperture being generally aligned with the outer sleeve aperture;

means for sealing the upstream end of the inner sleeve so that a fluid medium exiting the chamber flows through the downstream end thereof; and unidirectional flow means having an inlet end in fluid communication with the downstream end of the chamber and an outlet end for the discharge of the fluid from the unidirectional flow means, the unidirectional flow means including means for impeding a flow from the outlet end toward the inlet end to a substantially greater extent than a flow from the inlet end toward the outlet end.

2. A valve as in claim 1 wherein the unidirectional flow means comprises:

an outer portion; and an inner portion disposed coaxially within and radially spaced from the outer portion and forming an annular passage, the means for impeding the fluid flow being disposed in the annular passage.

3. A valve according to claim 2 wherein the portions have surfaces defining the annular passage and wherein the impeding means is defined by at least one of the surfaces.

4. A valve according to claim 3 wherein the surface includes a section deflecting a portion of the flow from the outlet toward the inlet in a direction other than the direction of a remainder of the flow from the outlet toward the inlet.

5. A valve according to claim 4 wherein the surface section comprises a wave-shaped surface.

6. A valve according to claim 5 wherein the surface opposite the wave-shaped surface comprises a scalloped-shaped surface.

7. A valve as in claim 2 including a cooling chamber disposed in the inner portion.

8. A valve as in claim 7 further comprising:

means for flowing a fluid into the cooling chamber; and means for flowing the fluid out from the cooling chamber, so that the fluid flowing through the chamber cools the valve.

9. A valve as in claim 1 further comprising means for substantially hermetically sealing the intermediate sleeve rotating means.

10. A valve as in claim 9 wherein the hermetically sealing means includes means for accommodating expansion of the intermediate sleeve rotating means.

11. A valve as in claim 1 further comprising means for flowing a fluid through an annulus defined by an inner surface of the outer sleeve and an outer surface of the intermediate sleeve.

12. A valve as in claim 1 wherein the outer sleeve aperture includes means for varying the valve capacity coefficient as the intermediate sleeve aperture passes into and out of alignment with the outer sleeve aperture.

13. A valve as in claim 1 wherein the intermediate sleeve aperture includes means for varying the valve capacity coefficient as the intermediate sleeve aperture passes into and out of alignment with the outer sleeve aperture.

14. A valve as in claim 1 wherein the inner sleeve aperture includes means for varying the valve capacity coefficient as the intermediate sleeve aperture passes into and out of alignment with the outer sleeve aperature.

15. A valve as in claim 1 further comprising means for adjusting the rotational speed of the intermediate sleeve.

16. A valve for generating high frequency fluid flow pulses in a downstream direction comprising:

first and second coaxially mounted valve members in close proximity and adapted to rotate relative to each other, each member having an aperture for the flow of fluid therethrough, the apertures being arranged so that they move into and out of registration during relative rotation of the members;

means for defining an fluid chamber on a side of one of the members; and undirectional flow means in fluid communication with the chamber and defining a fluid outlet therefrom for promoting the flow of fluid from the chamber through the outlet and for substantially inhibiting the flow of fluid through the outlet into the chamber, whereby a fluid flow pulse through the valve is established each time the apertures overlap each other and a fluid backflow through the outlet into the chamber is inhibited when the apertures are not in an overlapping position.

17. A valve according to claim 16 including a third valve member coaxial with and in close proximity to the second member and wherein the second member is rotatable relative to the first and third member, the third member having an aperture positioned in substantial alignment with the aperture in the first member.

18. A valve according to claim 16 wherein the members have a cylindrical configuration and wherein the chamber is radially inward of the second member.

* * * * *